US012066816B2

(12) United States Patent
Celli

(10) Patent No.: US 12,066,816 B2
(45) Date of Patent: Aug. 20, 2024

(54) METHOD FOR PREDICTING THE PRESENCE OF PRODUCT DEFECTS DURING AN INTERMEDIATE PROCESSING STEP OF A THIN PRODUCT WOUND IN A ROLL

(71) Applicant: ITALIA TECHNOLOGY ALLIANCE S.R.L., Bologna (IT)

(72) Inventor: Alessandro Celli, Bologna (IT)

(73) Assignee: ITALIA TECHNOLOGY ALLIANCE S.R.L., Bologna (IT)

(*) Notice: Subject to any disclaimer, the term of this patent is extended or adjusted under 35 U.S.C. 154(b) by 629 days.

(21) Appl. No.: 17/255,889

(22) PCT Filed: Jun. 25, 2019

(86) PCT No.: PCT/IB2019/055333
§ 371 (c)(1),
(2) Date: Dec. 23, 2020

(87) PCT Pub. No.: WO2020/003114
PCT Pub. Date: Jan. 2, 2020

(65) Prior Publication Data
US 2021/0261374 A1    Aug. 26, 2021

(30) Foreign Application Priority Data

Jun. 26, 2018 (IT) .......................... 102018000006680

(51) Int. Cl.
*G05B 19/418* (2006.01)
*B65H 18/08* (2006.01)
*B65H 26/02* (2006.01)

(52) U.S. Cl.
CPC ....... *G05B 19/41875* (2013.01); *B65H 18/08* (2013.01); *B65H 26/02* (2013.01);
(Continued)

(58) Field of Classification Search
CPC ............ B65H 2301/4148; B65H 26/02; B65H 2801/84; B65H 18/00; B65H 19/2269;
(Continued)

(56) References Cited

U.S. PATENT DOCUMENTS

2018/0284037 A1*  10/2018  Kashu .................... B65H 18/08
2019/0240889 A1*  8/2019   Lettowsky .............. B29C 48/10

FOREIGN PATENT DOCUMENTS

WO    2005100687 A2    10/2005
WO    2008004256 A1    1/2008
(Continued)

*Primary Examiner* — Giovanni Astacio-Oquendo
*Assistant Examiner* — Martin Walter Braunlich
(74) *Attorney, Agent, or Firm* — McGlew and Tuttle, P.C.

(57) ABSTRACT

Method for predicting the presence of product defects during an intermediate processing step of a thin product wound in a roll, which provides for—receiving a roll of thin product that has been assigned a unique identification code stored in a database system, this latter containing process and/or product parameters detected in the production steps of said thin product wound in said roll upstream of said intermediate processing step, associated with said unique identification code, —accessing said database system, —entering one or more of the process and/or product parameters associated with the unique identification code of said roll contained in said database system in a predictive model, which uses a correlation, created by means of machine learning logics, from historicized values related to the process and/or product parameters output from said intermediate processing step and historicized values related to process and/or product parameters of the same rolls detected in the production steps of said rolls upstream of said intermediate processing step, in order to predict product parameters output from said intermediate processing step, —comparing said aforesaid product parameters with respective predefined (Continued)

limit values, —generating predictive diagnosis information of thin product defects based on the result of said comparison.

18 Claims, 2 Drawing Sheets

(52) U.S. Cl.
CPC ............... *B65H 2301/4148* (2013.01); *B65H 2301/41702* (2013.01); *B65H 2301/542* (2013.01); *B65H 2301/544* (2013.01); *B65H 2553/52* (2013.01); *B65H 2801/84* (2013.01)

(58) Field of Classification Search
CPC .......... B65H 2515/314; B65H 2557/62; B65H 18/103; B65H 19/22; B65H 2301/41485; B65H 2301/5114; B65H 2701/12422; B65H 18/08; B65H 2301/41702; B65H 2301/41704; B65H 2301/542; B65H 2301/544; B65H 2511/23; B65H 2553/52; B65H 2701/1244; B65H 2701/1924; B65H 18/02; B65H 18/28; D21G 9/0045; D21G 9/00; G05B 11/32; G05B 13/048; G05B 19/41875; G05B 19/418; C23C 14/54; C23C 14/562

See application file for complete search history.

(56) References Cited

FOREIGN PATENT DOCUMENTS

| | | | |
|---|---|---|---|
| WO | 2009151419 | A1 | 12/2009 |
| WO | 2018109790 | A2 | 6/2018 |
| WO | WO-2018109790 | A2 * | 6/2018 ............. B65H 19/22 |

* cited by examiner

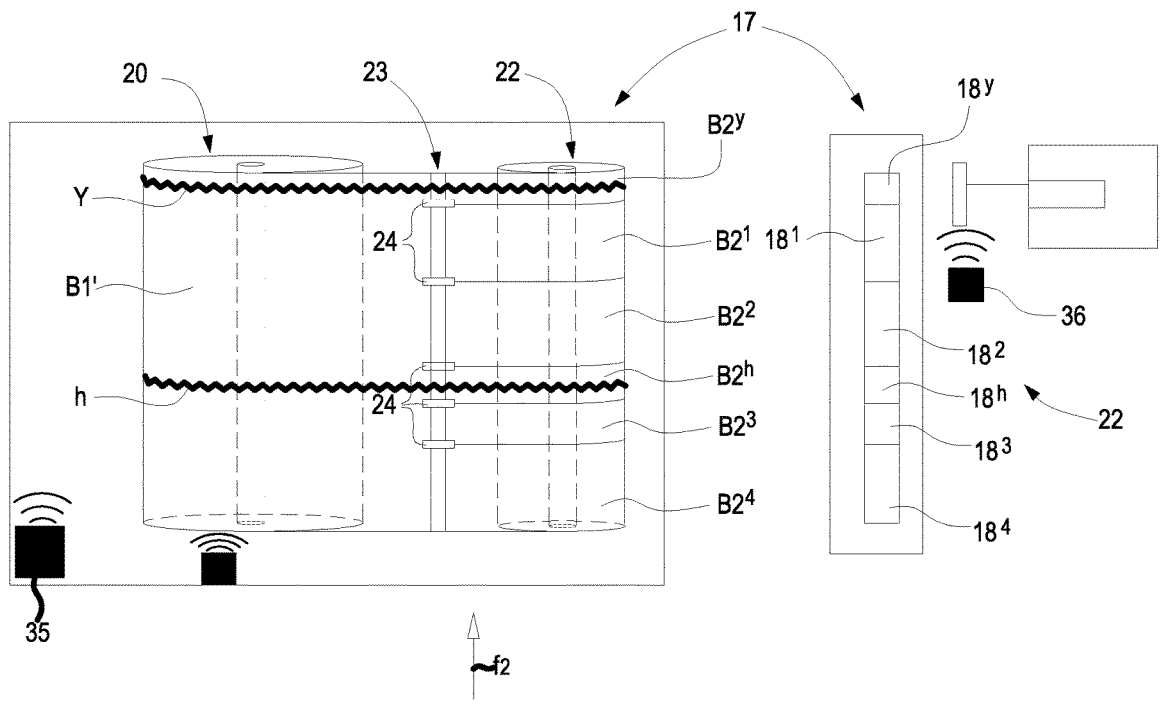
Fig.2
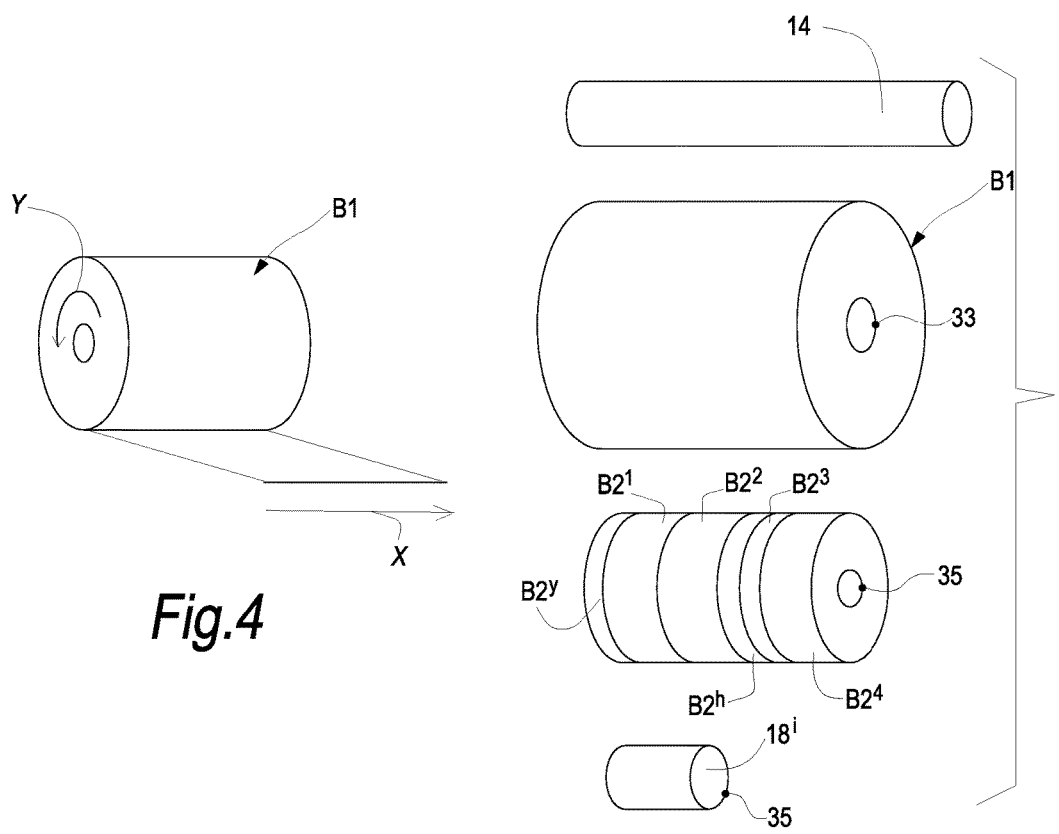
Fig.3
Fig.4

METHOD FOR PREDICTING THE PRESENCE OF PRODUCT DEFECTS DURING AN INTERMEDIATE PROCESSING STEP OF A THIN PRODUCT WOUND IN A ROLL

TECHNICAL FIELD

The present invention relates to the field of the production of continuous thin or web products to be wound in a roll, such as paper-based products, paper, tissue paper, nonwovens, films, multi-material and similar products.

More in particular, the invention relates to a method for predicting the presence of product defects during an intermediate processing step of a thin product wound in a roll.

Further, the invention also relates to a production plant for thin products wound in a roll that uses said method.

STATE OF THE ART

In many industrial sectors, rolls of web material, known as master rolls, for example produced by winding on a cylindrical core, require to be converted into rolls of a different dimension, through a process of unwinding these master rolls and rewinding in rolls with different dimensional characteristics by means of winding or rewinding machines. The smaller finished sub-rolls thus obtained are used as semi-finished products to feed production lines of other articles, known as converting lines.

Some facilities that produce master rolls can only produce master rolls and then send these rolls to customers for the subsequent conversions, for example including division into sub-rolls through rewinding machines for further processing, or can produce the sub-rolls internally and then send these sub-rolls to the final customer for production of the finished products. Before being sent, the rolls or sub-rolls are packaged to protect the product.

During production of the rolls, of the sub-rolls and of the finished products, product defects that can invalidate the quality of the finished product or create production problems can occur.

Typically, the term "defect" is meant as holes, chipped edges, dark stains, water, oil marks, thickening of the material, presence of foreign bodies, joins in the material.

These defects are evaluated and classified with a degree of severity that takes account of the quality grade required during the production steps of the roll. Generally, the presence of these defects is not tolerated, and in the subsequent production steps action is taken to eliminate them.

Elimination of a defect in general causes two problems. On the one hand, there is the inevitable loss of part of the product that contains the defect, while on the other hand often the production process must be significantly slowed down or even halted to eliminate the defect.

OBJECT AND SUMMARY OF THE INVENTION

The aim of the present invention is to solve the problems linked to the creation of product defects in the production of continuous thin, or web, products, to be wound in a roll, such as paper products, paper, tissue paper, nonwovens, films, multi-material and similar products.

Within this aim, an important object of the present invention is to develop a method that is able to predict the presence of product defects during the processing steps of a thin product wound in a roll so as to be able to optimize production, to obtain high quality products, to reduce production downtimes and to avoid or reduce rejects and problems in the subsequent processing steps.

These and other objects, which will be more apparent below, are achieved with a method for predicting the presence of product defects during an intermediate processing step of a thin product wound in a roll, which provides for:

receiving a roll of thin product that has been assigned a unique identification code stored in a database system and containing process and/or product parameters detected in the production steps of the thin product wound in said roll upstream of the intermediate processing step, associated with this unique identification code, accessing this database system, entering one or more of the process and/or product parameters associated with the unique identification code of the roll contained in the database system in a predictive model, which uses a correlation, created by means of machine learning logics, from historicized values related to the process and/or product parameters output from the intermediate processing step and historicized values related to process and/or product parameters of the same rolls detected in the production steps of these rolls upstream of the intermediate processing step, in order to predict product parameters output from the intermediate processing step, comparing said aforesaid product parameters with respective predefined limit values, generating predictive diagnosis information of thin product defects based on the result of said comparison.

Preferably, machine learning logics is meant as artificial intelligence logics.

The invention derives from observation of the fact that, during the rewinding and conversion steps of the rolls, defects can form in the finished product that were not detected previously as they were not present, not detectable or not classifiable as such in the initial processing step. Some of these defects are generated by processing conditions or faults during formation of the product, winding, packaging and the unwinding and secondary formation step, for rolls coming from the rewinder. These operating conditions or faults may not represent actual defects in the step in which they occur, but can be the cause (or concurrent cause) of defects in the process downstream.

Therefore, the invention relates to a method that allows identification of the operating conditions and faults in each step upstream, which will subsequently create defects in the process downstream. The invention also allows the prediction of some properties of the product output from the step(s) downstream, and optimal settings for these processes. Identification can be implemented at a later stage or in real time, based on observation of the operating conditions, allowing potential defects, which could thus appear on the product in the subsequent processing steps, to be marked and variations to be made to the process parameters, so as to avoid or limit the occurrence of potential problems.

The predictive model can use a first set of historical data related to a plurality of process and/or product parameters detected in the production steps of these rolls upstream of the intermediate processing step and a second set of historical data related to a plurality of process and/or product parameters detected output from the intermediate processing step of the prediction; by means of Machine Learning or Artificial Intelligence algorithms, a learning function that correlates said two sets is generated, generating a prediction function that allows prediction, through the analysis of one or more of the same process and/or product parameters detected upstream of the intermediate processing step, one or more process and/or product parameters output from said intermediate processing step.

It is clear that upstream of the intermediate processing step parameters are detected that are greater in number with respect to the product defects alone (which can be comparable to specific product parameters), and which preferably have one or more process parameters and optionally one or more product parameters. The larger the number of product and process parameters used that can be correlated to one another is, the greater the prediction precision will be.

Advantageously, the predictive model considers at least two different process and/or product parameters combined with one another and detected upstream of the intermediate processing step, in order to predict an event, i.e., a process and/or product parameter such as preferably a product defect or an inauspicious process event.

The predictive model is based on Artificial Intelligence algorithms that perform a learning function and a prediction function:

said learning function is based on the process and product parameters acquired, with the aim of finding the structure of correlations and of cause-effect relations existing between the system variables; said learning function implements a correlation between all the parameters historicized in the previous steps and the parameters identified in the subsequent steps, such as the conversion and rewinding step and the product quality; said learning function allows the development of an artificial intelligence model that correlates the product and process parameters and the product quality with the conditions that are capable of influencing the appearance of the defect; said learning function generates the prediction function;

said prediction function has the aim of indicating the potential product and/or process parameters that can appear in real time, based on the parameters detected up to that moment.

Preferably, the method provides for storage in the database system of a plurality of process parameters detected in the production steps of the thin product wound in said roll upstream of the intermediate processing step.

Preferably, the method provides for storage in the database system of a plurality of process parameters detected during the intermediate processing step.

Preferably, the method provides for storage in the database system of a plurality of product parameters detected in the production steps of the thin product wound in said roll upstream of the intermediate processing step.

Preferably, the method provides for storage in the database system of a plurality of product parameters detected during the intermediate processing step.

Preferably, the method provides for storage in the database system both of a plurality of product parameters and of a plurality of process parameters detected in the production steps of the thin product wound in said roll upstream of the intermediate processing step.

Preferably, the method provides for storage in the database system both of a plurality of product parameters and of a plurality of process parameters detected in the production steps of the thin product wound in said roll during the intermediate processing step.

Preferably, the product and process parameters that can be associated with a roll are chosen from the following and must be detected upstream of the intermediate processing step or during the intermediate processing step product type identification;
machine type;
roll length;
roll format width;
external roll diameter;
width profile as a function of wound length, as a function of Y;
basis weight of the wound thin product;
basis weight tolerance of the wound thin product;
type of core on which the thin product is wound to produce the roll;
core diameter;
spindle identifier;
roll weight;
roll production start date and time
roll production end date and time;
room temperature;
relative humidity;
product quality grade;
roll quality grade;
roll density;
roll density profile as a function of Y;
operator or production manager identifier
roll speed profile as a function of Y;
winder speed profile as a function of Y;
production line acceleration as a function of Y and/or winder acceleration as a function of Y;
surface treatments applied;
position of surface treatments;
basis weight profile along X and along Y;
thickness profile along the X axis and along Y;
humidity profile along the X axis and along Y;
formation specifications;
type of bonding;
mix of fibers used, or mix of polymers used;
degree of refinement;
mix of types of water used;
coagulant concentration;
flocculant concentration;
slurry conductivity;
mechanical properties—load;
mechanical properties—wet burst;
mechanical properties—elastic constant;
temperatures detected along the formation of the product along Y;
oven or hood temperature profile along Y;
print pitch along Y;
NIP force applied per unit of length by the calender along Y;
calender temperature along Y;
winding tension profile along Y;
winder slip profile;
type of control applied;
production recipe identifier;
included defects detected by the detection system, comprising:
  no. included defects;
  defect image;
  defect type;
  position X;
  position Y;
  dimension along X;
  dimension along Y;
  defect area;
  degree of severity;
roll growth profile diameter/meters wound;
video images collected along the formation of the product with time stamping referred to the Y axis of the roll.

Preferably, the process parameters used detected in the production steps of the thin product wound in said roll upstream of the intermediate processing step are preferably in a number greater than three, and more preferably in a number greater than five, thereby ensuring a greater degree of prediction. Preferably, the product parameters used detected in the production steps of the thin product wound in said roll upstream of the intermediate processing step are preferably greater than three in number, and more preferably greater than five in number, thereby ensuring a greater degree of prediction.

Advantageously, subsequently to the generation of predictive information, the method comprises an action, in the intermediate processing step, adapted to modify the processing process parameters in order to avoid exceeding said limit values, or to reject portions of product potentially dangerous for any processing downstream of said station.

Advantageously, the intermediate processing step is a rewinding step, comprising unwinding of the thin product of a roll, defined primary roll, and winding of the thin product in one or more rolls, defined secondary rolls, with lateral dimensions the same as or smaller than the primary roll, wherein there is associated with the primary roll a unique identification code, defined primary code, stored in the database system and with which there are associated process and/or product parameters detected in the production steps of the product upstream of the rewinding step, and there is associated with each secondary roll a related unique identification code, defined secondary code, with which there are associated both process and/or product parameters detected in the production steps of the thin product upstream of the rewinding step, and process and/or product parameters detected in the rewinding step, Alternatively, the intermediate processing step is a conversion step of the thin product wound in a roll into a finished or semi-finished article, which includes unwinding of a roll of the thin product and insertion of the thin product into a conversion module of the thin product wound in a roll into a finished or semi-finished article.

Advantageously, in the database system, there are associated with the unique identification code of the roll process and/or product parameters detected during in-line production of the thin product and/or during subsequent winding of said thin product produced in line in a said roll.

Preferably, in the database system, there are associated with the unique identification code of the roll process and/or product parameters detected during a packaging step of the roll.

Advantageously, the method comprises the detection of these process and/or product parameters along the whole of the process, and the consequent association with the roll containing the thin product to which the parameters refer, which goes from the production step of the thin product before winding in the primary roll, to the conversion step, and can thus also comprise a rewinding step and a packaging step and the predictive model is adapted to predict product parameters based on the parameters detected upstream of the step to which the prediction refers, based on historicized parameters related to corresponding steps.

Advantageously, the product and/or process parameters, for a related roll, are stored as a function of the position of the area of the product in the parameter of which it was detected.

With reference to this latter aspect, preferably the position of the area of the product in the parameter of which it was detected is stored by means of a system of coordinates with origin referred to the same roll, comprising a first axis of coordinates parallel to the axis of the roll, with zero preferably corresponding to a side of the roll, and a second axis of coordinates corresponding to the linear unwinding of the thin product about the axis of the roll on which it is wound, with origin preferably coinciding with the starting point of winding of the thin product on the core of the roll.

Advantageously, the assigning of a unique identification code to the roll can include marking the roll by applying an a) graphic, b) electronic, for example of RFID type, or c) magnetic band medium, containing the unique identification code, and storing the unique identification code in the database system.

In the case of an electronic or magnetic medium, it can include a programming step for assigning said identification code of said medium, which takes place before applying the medium to said at least one roll, or when said medium is applied to the primary roll.

Advantageously, there can be a step of reading the unique code of said roll at the start of said intermediate processing step of the thin product wound in the roll.

According to another aspect, the invention relates to a plant for producing rolls of thin products, comprising:
 a production line of continuous thin product, comprising
  a control system capable of knowing product and/or process parameters of the same line,
 a database system containing product and/or process parameters detected during production of the thin product and of the rolls and identification codes of the rolls produced associated with the product and/or process parameters related to said rolls,
 at least one winder positioned at the outlet of the production line of continuous thin product, adapted to wind the thin product exiting from said line in a primary roll, comprising a management system of the winder, a reading and/or writing device on graphic, electronic or magnetic media, to be associated with the primary rolls being wound, adapted to write or program said media, operatively connected with the electronic management unit and an evaluation system of the product entering the winder, preferably comprising a quality control module QCS, and/or a visual inspection module of the defects and/or of the type that detects metal particles,
 an optional rewinder adapted to produce one or more secondary rolls from said primary rolls coming from the winder, comprising an evaluation system of the product being wound in the secondary rolls, which can for example comprise a visual inspection module of the defects and/or of the type that detects metal particles, and a further optional quality control module QCS, a reading device of the identification code of the roll being unwound, and a reading and/or writing device on graphic, electronic or magnetic media, of identification codes to be associated with the secondary rolls being wound, and a management system adapted to communicate the product and/or process parameters detected by said evaluation system of the product being wound to said database system in association with the identification codes of the secondary rolls to which said parameters refer,
 an optional packaging station for primary or secondary rolls, comprising a reading device of the identification codes of the rolls on media associated with said rolls, and a management system of the packaging step, with which there is associated an evaluation system of the rolls that are packaged, which can for example comprise a visual inspection module, said management system being adapted to communicate the product and/or process parameters associated with the packaging and detected by said evaluation system of the rolls being packaged to said database system in association with the identification codes of the rolls to which said parameters refer, a conversion station for rolls into finished or semi-finished products, comprising one or more unwinding stations for one or more rolls, a conversion machine of said one or more rolls, a reading device of the identification codes of the rolls being unwound, an evaluation system of the product unwound from the rolls and entering the conversion machine, which can for example comprise a visual inspection module, sensors of the conversion machine being optionally present to determine parameters of the product being processed, the process and/or product parameters acquired during the conversion step being associated with the respective rolls being unwound, or with their identification codes in the database system, a management software of the process and/or product parameters associated with the unique identification codes of the rolls contained in said database system, in which there is implemented a predictive model, which uses a correlation, produced by machine learning logics, between historicized values related to the process and/or product parameters output from a processing step of the plant and historicized values related to process and/or product parameters of the same rolls detected in the production steps of said rolls upstream of said intermediate processing step, said model being adapted to predict product parameters output from said processing step.

Advantageously, the plant can comprise means for varying the process parameters of said production line of thin product, and/or of said winder, and/or of said packaging, and/or of said rewinder, and/or of said conversion station, adapted to modify the processing process parameters in order to avoid exceeding said limit values, or to reject portions of product potentially dangerous for any processing downstream of said station.

According to another aspect, there is described a rewinder for unwinding the thin product from a primary roll (or master roll) and rewinding it on one or more sub-rolls (or secondary rolls), comprising an optional station for producing secondary cylindrical cores for the secondary rolls to be formed,
a winding station provided with an unwinding zone (comprising an unwinder of the primary roll),
a winding cradle adapted to receive secondary cores arranged coaxial and side by side, in front of said unwinding zone,
a cutting device, with a plurality of blades, arranged between said unwinding zone and said winding cradle,
an evaluation system of the product being wound in one or more secondary rolls, which can comprise a visual inspection module of the defects and/or of the type that detects metal particles.

BRIEF DESCRIPTION OF THE DRAWINGS

Further characteristics and advantages of the invention will become more apparent from the description of several preferred but non-exclusive embodiments thereof, illustrated by way of non-limiting example in the accompanying drawings, wherein:

FIG. 2 represents a schematic top view of a rewinder used in the plant of FIG. 1;

FIG. 3 is an assembly of rolls and cores for rolls used in the plant of FIG. 1;

FIG. 4 is a diagram illustrating the reference system of the position of the defects on a roll.

DETAILED DESCRIPTION OF AN EMBODIMENT OF THE INVENTION

Figure 1:
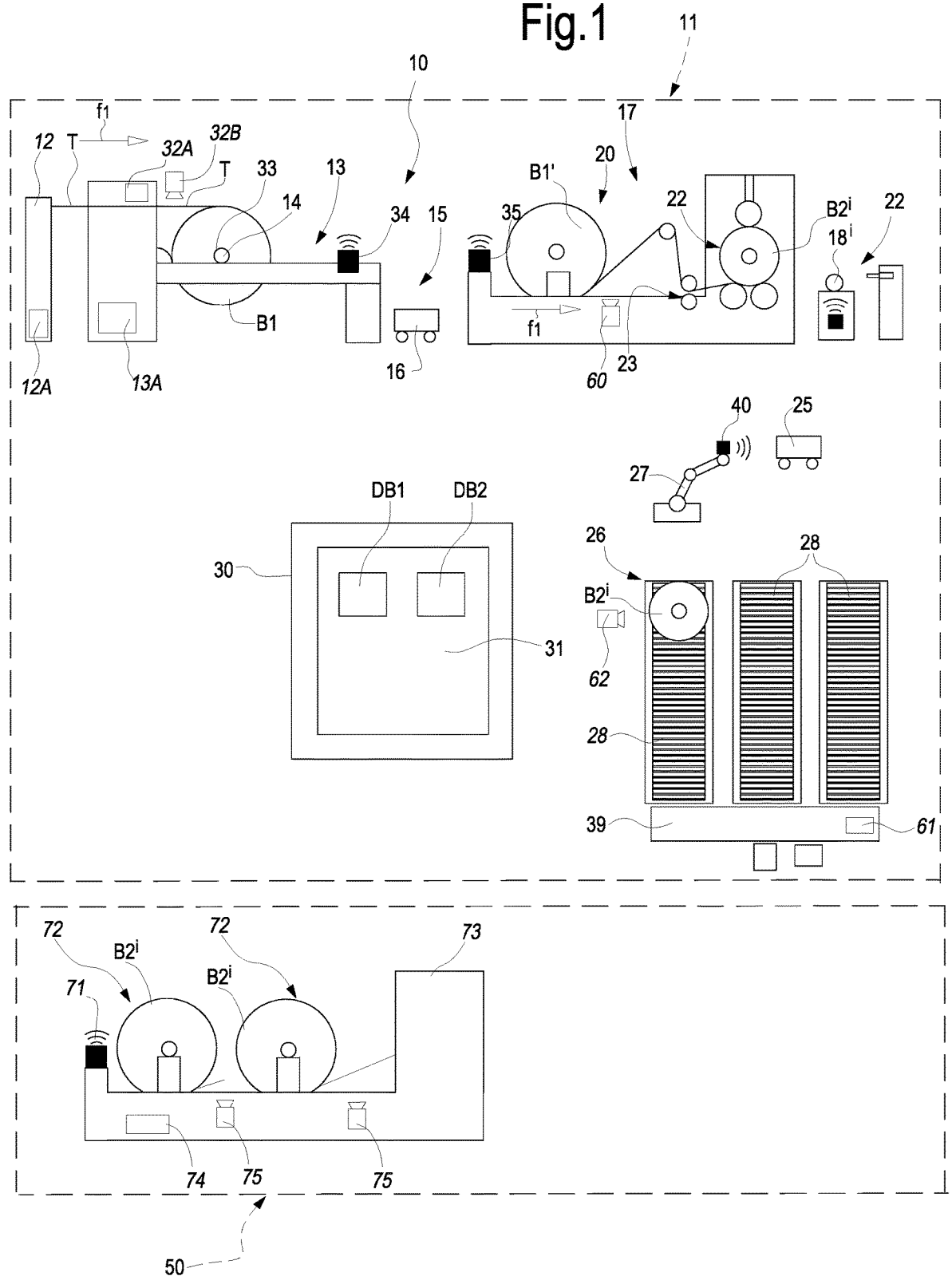
FIG. 1 represents a schematic view of a production plant of rolls of thin product, according to the invention.

With reference to the aforesaid figures, a diagram of a plant according to the invention is indicated as a whole with the number 10. This plant is inside a production facility 11, adapted to produce and store master rolls, hereinafter also indicated as primary rolls B1, and to produce from the master rolls B1 further rolls, or sub-rolls, also indicated hereinafter as secondary rolls B2$i$.

Hereunder the components of the plant 10 of known type are preliminarily described. The plant 10 comprises a production line of continuous thin, or web, product T, such as paper, tissue paper, nonwoven, or other similar products (films, multi-material products, etc.), the end part is indicated with the number 12. The control system of this line is indicated with 12A. This control system is capable of knowing product and process parameters of the line 12 described hereunder.

At the end of the production line 12, one or more winders 13 are provided (only one winder is shown in the figures). The winder 13 comprises a spindle on which a cylindrical tubular core of the thin product T is placed, hereinafter indicated as primary core 14. The primary core is rotated in the same direction as the feed f1 (machine direction) of the thin product T on the line 12, with consequent winding of the product on the primary core 14, to produce the master or primary roll B1. The management system of the winder is indicated with 13A.

The plant 10 is provided with an electronic control device 30 of the various parts, which is provided with PLC systems for managing the operation of the various parts and interface computers, operatively connected to one another by means of a network. The electronic control device 30 also comprises a database system 31 that comprises one or more sub-databases with information (product and process parameters, and yet other information) loaded before the start of a production and acquired during the various processing steps. The database system 31 allows the various parts to interact in a manner coordinated with one another.

An evaluation system of the product entering the winder 13 is provided, for example comprising a quality control module QCS (quality control system) 32A, of known type in the paper production field (for example comprising one or more of the following sensors: a sensor for detecting basis weight, thickness, humidity, a sensor for detecting ash, color, opacity, orientation of the fibers, permeability of the thin product, etc.), which can comprise viewing systems, and a visual inspection module 32B of defects and/or of the type that detects metal particles, also of known type, which can also comprise viewing systems.

Typically, "defect" is meant as holes (also smaller than 1 mm in diameter), chipped edges, dark stains, water, oil marks, thickening of the material, presence of foreign bodies, joins in the material (i.e. the position of these joins along the extension of the thin product created by cutting the product crosswise upstream and downstream of defective zones and splicing the remaining ends).

The viewing systems are systems that through image acquisition are capable of detecting defects such as holes, tears, creases, foreign bodies, etc. QCS systems are for example based on the reflection and/or refraction of infrared light sources or on the absorption of beta particles and allow detection, for example, of the product thickness profile, basis weight profile, relative humidity profile, thickness profile of specific treatments (coatings); these parameters can be associated with the quality of the product. Excessive deviation of these measurements from the reference values are comparable to product defects. Metal detection systems are systems capable of detecting the presence of metal foreign bodies in the product with dimensions of even below one millimeter.

The method provides for storage of the product and process parameters known by, and detected through, the control system 12A of the line 12, the management system 13A of the winder 13, the quality control module QCS 32A, the visual inspection module of the defects and/or of the type that detects metal particles 32B, in the database system 31 and association thereof with the primary identification code of the primary roll, described below.

In general, in the plant, the process and/or product parameters can be divided, for example, into two categories, data of "static" type, which characterize each roll as a whole, and data of "dynamic" type, i.e., linked to the length and/or diameter of the roll and hence to the processing instants thereof. These parameters are historicized as profiles as a function of the length of the roll or diameter. The values if acquired as a function of time can be converted as a function of the length or diameter, based on the winding speed of the roll.

To identify positions and distances in the rolls produced in the plant, the following reference system linked to the roll is, for example, used. The origin of the X axis of the reference system roll coincides with the left side of the roll; left is intended as the left of a hypothetical operator unwinding the roll towards himself/herself from below; this X axis is parallel to the winding/unwinding axis of the roll corresponds to the "Cross Direction" of the machine. The origin of the Y axis of the roll reference system coincides with the start of the roll, the starting point of winding (i.e., fastening to the core of the roll), and thus represents the position in the direction of length, or "Machine Direction". Naturally, it is possible to convert the Y axis with the coordinate linked to the distance from the winding axis, i.e. to the diameter of the roll.

The product and process parameters that can be associated with the unique code of the primary roll are, for example, the following:
- product type identification (this is a code that identifies the product type; the notation depends on the type of product/process/producer/customer);
- machine type (code that represents the machine(s) used);
- roll length;
- roll format width;
- external roll diameter;
- width profile as a function of wound length, as a function of Y;
- basis weight of the wound thin product;
- basis weight tolerance of the wound thin product;
- type of core on which the thin product is wound to produce the roll;
- core diameter;
- spindle identifier (this is a parameter that identifies the spindle on which the roll is wound);
- roll weight:
- roll production start date and time:
- roll production end date and time;
- room temperature;
- relative humidity;
- product quality grade (this is a quality index of the wound product generated through automated instruments or indicated by the operator);
- roll quality grade (this is a quality index of the roll, intended as shape and external aesthetic defects; index generated through automated instruments or indicated by the operator);
- roll density;
- roll density profile as a function of Y;
- operator or production manager identifier (the association between identifier and physical person is not known to the system);
- production line speed profile as a function of Y;
- winder speed profile as a function of Y;
- production line acceleration as a function of Y and/or winder acceleration as a function of Y;
- surface treatments applied (indication of the type of treatment applied to the product; for example chemical, waterproofing treatments, etc.);
- position of the surface treatments (vector of positions along the X axis);
- basis weight profile along X and along Y (the profile along the X axis is measured by the QCS systems or inspection systems; the system historicizes the basis weight vectors measured along X to create the complete profile along X and Y; the resolution and hence the number of points stored depends on the resolution of the QCS instrument; by way of example, the resolution along X can be of 32 sectors along the width of the product);
- thickness profile along the X axis and along Y (see note above for the basis weight profile along X and along Y);
- humidity profile along the X axis and along Y (see note above for the basis weight profile along X and along Y);
- formation specifications (e.g., formation mode of a nonwoven);
- bonding type (method for bonding the fibers, typical in the nonwoven field, for example, needles, ultrasonic, water, through a calender, etc.);
- mix of fibers used (e.g., the percentage of different types of fibers used for the slurry, typical in the paper field), or mix of polymers used (typical in the production field of some nonwovens);
- degree of refinement (SH degree of refinement of the fibers used, typical in the paper field);
- mix of types of water used (percentages of the different types of water used for the slurry, typical in the paper field);
- coagulant concentration (typical in the paper field);
- flocculant concentration (typical in the paper field);
- slurry conductivity (typical in the paper field);
- mechanical properties—load (sample testing of mechanical properties carried out on the product outside the line, typical in the paper field; the result of the test can be associated with the roll from which the sample was taken);
- mechanical properties—wet burst (sample testing of mechanical properties carried out on the product outside the line; the result of the test can be associated with the roll from which the sample was taken);
- mechanical properties—elastic constant (sample testing of mechanical properties carried out on the product outside the line, typical in the nonwoven field; the result of the test can be associated with the roll from which the sample was taken);

temperatures detected along the formation of the product along Y (temperatures detected by the sensors installed along the line; the values (a vector of values) are historicized along the Y axis of the roll; if the direct temperature of the product is not detected, alternatively the temperature of the surface of the cylinders or air involved in the formation can be detected);

oven or hood temperature profile along Y;

print pitch along Y (if printing of the product in line is present);

nip force applied per unit of length by the calender along Y;

calender temperature along Y (typical in the nonwoven field);

winding tension (or pull) profile along Y (nip force applied per unit of length between roll and winding roller);

slip profile (difference in speed) of the winder;

type of control applied (type of control applied for formation of the roll, e.g., control based on pull of the ply, slip or difference in speed, etc.);

production recipe identifier (this represents an identifier of the recipe used to produce the product)

included defects detected by the detection system (e.g. viewing system), which comprises:
  no. included defects;
  defect image (image of the defect);
  defect type (code that identifies the defect type and its dimensions);
  position X (position of the defect with the roll reference system);
  position Y (position of the defect with the roll reference system);
  dimension along X;
  dimension along Y;
  defect area;
  degree of severity;

roll growth profile diameter/meters wound this represents the diameter of the roll as a function of Y);

video images collected along the formation of the product with time stamping referred to the Y axis of the roll (the various images and videos collected along the production line that can give indications in the process modeling can be historicized so as to be traceable to a point Y of the roll).

The information related to some or all product and process parameters listed above are stored in a first database DB1 of the database system 31.

Before winding of the product T on the primary core 14 of the winder 13, to produce the primary roll B1, the primary core 14 is marked electronically by applying a first label or RFID medium 33, for example on an outer edge of the primary core 14.

Once the primary roll B1 has been produced, by means of a first reading and/or writing device on electronic media, such as an RFID antenna 34, operatively connected with the electronic control device 30, positioned at the outlet of the winder 13, the RFID label 33 is assigned a primary identification code G, which is found in a second database DB2 of the database system 31.

The electronic device 30 produces an association, in said second database DB2, between the information of the product and process parameters described above for the primary roll present in the first database DB1, and the primary identification code G of the same primary roll, so that, in this second database DB2, there is associated with a given primary identification code information related to the aforesaid product and process parameters, associated with the globality of the primary roll ("static" parameters) and with the position in the roll ("dynamic" parameters).

It is understood that the primary identification code G can be assigned to the RFID label 33 also before the start of the winding step of the product T on the winder 13 (for example assignment can take place before the RFID label is applied to the primary core or immediately afterwards), while association of the defects detected takes place after the end of the winding step. Moreover, the RFID label 33 can also be applied to the primary core 14 after the winding step on the winder 13 (and assignment of the code can take place before the RFID label is applied to the primary core or immediately afterwards). The label can be applied to the core of the roll, or to the surface of the roll.

Alternatively to the electronic label, a marking of graphic type (application of a graphic medium such as an alphanumeric code, a bar code or a QR code) or with a magnetic band can be used.

In the case in which an electronic or magnetic medium is used, it includes a programming step for assigning the primary identification code of the medium, which takes place before applying the medium to the roll, or when said medium is applied to the primary roll.

An operator can be present in the formation plant of the primary roll 10.

Located downstream of the winder 13 is an unloading zone 15, provided with at least a first handler 16 to move the primary rolls B1 toward a packaging or storage zone, or directly toward one (or more) rewinders 17 (only one rewinder is indicated in the diagram).

The rewinder 17 comprises a station 22 for producing the secondary tubular cylindrical cores 18$i$ for the secondary rolls B2$i$ to be formed and a winding station 19 provided with the unwinding zone 20 of the primary roll to be unwound, a zone 21 for arrangement of the secondary cores 18$i$ arranged coaxial and side by side, also known as "winding cradle", in front of the unwinding zone 20, and a cutting device 23, with a plurality of blades 24, arranged between the unwinding zone 20 and the zone 21 for arrangement of the secondary cores. With the plurality of blades 24 there are associated position indicators (not indicated) to move the blades according to the direction f2, i.e., transverse to the unwinding direction and adjust the cutting position so as to cut the thin product into continuous webs of a width equal to the transverse width of the secondary cores 18$i$.

The term "transverse" is meant as a direction orthogonal to the direction of feed f1 of the thin product, i.e., a direction parallel to the axis of rotation of the primary roll B1 and to the axis of the secondary cores 18$i$ and hence of the secondary rolls B2$i$.

At least a second handler 25 is provided, adapted to move the secondary rolls thus produced toward a packaging station 26.

In this example, this packaging station 26 comprises a robot 27, for example an anthropomorphic arm, which picks up the secondary rolls from the handler 25 and places them on one (or more) conveyor belts 28. A packaging device 39 is provided at the end of this conveyor belt 28, for packaging one or more secondary rolls B2$i$, for example by means of a covering film.

Through a third handler 29, the pack formed with one or more secondary rolls is taken from the packaging station 26 to the storage zone provided.

Returning to the winder 13, from the unloading zone 15 thereof, the primary roll B1 thus formed, by means of the first handler 16 (for example a carriage or a shuttle), is taken and loaded onto the rewinder 17. Here, a second electronic reading and/or writing device on electronic media, such as a second RFID antenna 35, reads the primary identification code G of the primary roll B1 programmed in the RFID electronic label 33. Therefore, the electronic device 30 recognizes the primary roll being processed, and through the primary code G finds the information on the product and/or process parameters present in the first database DB1.

Before positioning the blades of the cutting device 23, the electronic device 30 controls the station 22 for producing the secondary cores 18$i$ to organize the production of these secondary cores 18$i$ so as to produce the secondary rolls appropriately (the secondary cores 18$i$ have the same transverse width as the webs of the related secondary rolls). If necessary, the number and the transverse width of the plurality of secondary cores 18$i$, and hence the corresponding cut of the thin product coming from the primary roll B1, can be determined taking into consideration the information related to the position of the product and/or process parameters of the thin product in the primary roll, so that a desired set of parameters is provided in each secondary roll B2$i$.

The product and/or process parameters are stored in the first database DB1 and associated with the code G1 that identifies the roll B1'. Once the primary roll B1' is on the rewinder 17, the electronic device 30 reads the code G1 from the related first RFID label 33 and identifies the map of the parameters associated with the same roll. Therefore, the electronic control device 30 transforms the position information of the parameters on the primary roll B1' into position information of the parameters on each secondary roll B2$i$ to be produced (for example the secondary rolls 18$h$-181-182-18$y$-183-184).

In the station 22, production of the secondary cores takes place by cutting a common tubular cylindrical core into a plurality of secondary cores on which the product T will be wound during rewinding (in some embodiments, the station for producing the cores may be absent).

The secondary cores, coaxial and side by side in the order 18$h$-181-182-18$y$-183-184, are arranged in the zone 20 of the rewinder 13. Likewise, the electronic device 30 arranges the five blades 24 of the cutting device 23 so as to cut the product T exiting from the primary roll B1', according to the machine direction, into webs corresponding to the interfaces between the secondary cores 18$h$-181-182-18$y$-183-184.

Subsequently the rewinding step is controlled, i.e., unwinding of the thin product T from the primary roll B1' and subsequent winding of the product T, advantageously cut by the device 23 in the positions described above, on the secondary cores 18$i$, to produce the secondary rolls B2$i$.

Advantageously, after producing the secondary cores 18$h$-181-182-18$y$-183-184, these are marked electronically by applying respective second electronic labels or RFID media 35.

Through a third electronic reading and/or writing device on electronic media, such as a third RFID antenna 36 present in the rewinder 17, the electronic control device 30 assigns respective secondary identification codes Ki to the second RFID labels 35 of the secondary cores 18$i$, which are found in the second database DB2 of the database system 31.

As said, the electronic control device 30 has converted the position information of the product and/or process parameters on the primary roll B1' into position information of the product and/or process parameters on each secondary roll B2$i$, for example the position coordinates of the parameters in the secondary roll in terms, for example, of unwound meters of product from the center of the secondary roll and of distance from an edge of the secondary roll (i.e., with respect to a reference system integral with the secondary roll). Subsequently, the device 30 associates, in the second database DB2, the secondary codes Ki and the respective position information of the parameters on the related secondary rolls B2$i$, so that there is associated with each secondary roll B2$i$ a set of product and/or process parameters and this set is stored, in association with the code of the secondary roll, in the database system 31.

The result is that for each secondary roll B2$i$, a map of product and/or process parameters is known, in addition to the parameters linked to the same roll, regardless of the position on the product wound thereon.

Preferably, the marking of the secondary rolls B2$i$ takes place on the respective secondary cores 18$i$ before the winding step of the thin product on the same secondary cores starts. In other embodiments, this marking can instead take place after winding, i.e., when the secondary rolls B2$i$ are terminated and/or unloaded from the rewinder 13.

The programming step for assigning the secondary identification code Ki to the respective second RFID label 35 can take place before the second RFID label is applied to the corresponding secondary roll, or when this second RFID label is applied to the secondary roll, as described above (and this assigning of the secondary identification code Ki can also take place after the winding step of the product on the respective second core 18$i$, but in any case preferably before the secondary roll B2$i$ leaves the rewinder 13.

Once the secondary rolls B2$i$ with the respective second labels have been created, these are moved by the rewinder 13, through the second handlers 25, for example carriages or shuttles, to the packaging station 26.

In other embodiments, the winder may be absent from the plant and the continuous thin product is fed directly from the production line to a winder of the rewinder type, so that from the production line the product is cut into webs of the same width as the cores present in the rewinder, to create a plurality of rolls that will then be sent to the packaging zone or toward other processing zones.

It should be noted that the cut in a rewinder may only involve trimming of the edges of the thin product being wound on the cores, so that a single roll with the wound finished product and one or two scrap rolls containing the trimmings, which will be rejected, can be delivered from the rewinding machine; alternatively, only one roll can be delivered and the trimmings are rejected continuously through trimming suction mouths.

Advantageously, there is associated with the rewinder an evaluation system 60 of the product being wound in the secondary rolls, which can for example comprise a visual inspection module of the defects and/or of the type that detects metal particles, for example similar to the one described for the winder 13, and a further optional quality control module QCS (not indicated).

Therefore, as well as the product and/or process parameters correlated to the production step of the thin product, and to the winding step on the winder 13, the product and/or process parameters detected during the rewinding step are also associated with the secondary codes Ki of the secondary rolls B2$i$, in the database DB2.

The new product and process parameters associable with the unique identification code of the secondary roll are for example one or more of the following:
    master roll identification (this is, for example the identification code of the primary roll from which the secondary roll derives; there can be one or more master rolls according to the type of process);

machine type (code that represents the machine(s) used);

roll length;

roll format width;

external roll diameter;

width profile as a function of the wound length, as a function of Y;

number of plies;

type of core on which the thin product is wound to produce the roll;

core diameter;

spindle identifier (this is a parameter that identifies the spindle on which the roll is wound);

roll weight;

roll production start date and time;

roll production end date and time;

room temperature;

relative humidity;

product quality grade (this is a quality index of the wound product generated through automated instruments or indicated by the operator);

roll quality grade (this is a quality index of the roll, intended as shape and external aesthetic defects; index generated through automated instruments or indicated by the operator);

roll density;

roll density profile as a function of Y;

operator or production manager identifier (the association between identifier and physical person is not known to the system);

unwinding speed profile as a function of Y;

unwinding speed profile as a function of Y;

winding speed profile as a function of Y;

acceleration as a function of Y;

elongation as a function of Y;

mechanical properties—elastic constant (sample testing of mechanical properties carried out on the product outside the line, typical in the nonwoven field; the result of the test can be associated with the roll from which the sample was taken);

mean neck-in (this represents the narrowing of the product after the longitudinal cut; it is a typical parameter of nonwovens);

neck-in profile as a function of Y (this represents the narrowing of the product after the longitudinal cut; is a typical parameter of nonwovens);

product temperature measured as a function of Y;

print pitch along Y (if product print is present);

nip force applied per unit of length between roll and rider roller as a function of Y;

nip force applied per unit of length between roll and load-bearing rollers as a function of Y;

slip profile (difference in speed) between unwinding and winding as a function of Y;

tension (or pull) profile applied to the product as a function of Y;

load-bearing roller torque as a function of Y;

type of control applied (type of control applied for formation of the roll, e.g., control based on the pull of the ply, slip or difference in speed, etc.);

production recipe identifier (this represents an identifier of the recipe used to wind the product; the recipe is a set of settings);

included defects detected by detection system (for example viewing system), comprising:
no. included defects;
defect image (image of the defect)
defect type (code that identifies the defect type and its dimensions)
position X (position of the defect with the roll reference system);
position Y (position of the defect with the roll reference system);
dimension along X;
dimension along Y;
defect area;
degree of severity;

roll growth profile diameter/meters wound (this represents the diameter of the roll as a function of Y);

video images collected along the formation of the product with time stamping referred to the Y axis of the roll (the various images and videos collected along the production line that can give indications in the process modeling can be historicized so as to be traceable to a point Y of the roll).

As said, from the rewinder the secondary rolls can be moved to the packaging station 26.

This latter is provided with a fourth electronic reading and/or writing device on electronic media, such as a fourth RFID antenna 40 operatively connected with the electronic control device 30, which reads the second RFID labels 35 of the second rolls B2$i$ that reach the station 26, reading their secondary identification codes Ki. From this reading, the electronic control device 30 interacts with the second database DB2.

The packaging station 26 is also provided with a management system 61 of the packaging step, associated with which is an evaluation system 62 of the rolls that are packaged, which can for example comprise a visual inspection module.

The data collected by the management system 61 of the packaging step can come from the control system for transport, handling and wrapping of the roll, from the evaluation system 62 of the rolls, and also directly from the operator.

The management system 61 of the packaging step also has the aim of sending the information collected to the database system.

Therefore, as well as the product and/or process parameters correlated to the production step of the thin product, and to the winding step on the winder 13, product and/or process parameters detected during packaging are also associated with the identification codes of the rolls (primary and secondary) in the database system.

In this step the product and/or process parameters associated with the roll are of constant type.

The product and/or process parameters acquired and transmitted to the database system and hence associated with the identification code of the packaged roll can comprise one or more of the following:

identifier of the type of packaging machine;

destination customer identifier (alternatively data related to the distance or place of transport);

operator or production manager identifier (the association between identifier and physical person is not known to the system);

processing step start date and time;

processing step end date and time;

roll weight;

images from visual inspection module;

type of wrapping, recipe (this represents an identifier of the recipe used to wrap the product; the recipe is a set of settings);

wrapping material;
no. of wrapping layers;
quality grade associated with the form of the roll (presence of protruding or retracting cores, discrepancies in the profile such as ringing, starring, stains, etc.; the quality grade can be assigned by the operator or automatically assigned through analysis of the images of the visual inspection system);
storage start date and time;
storage end date and time;
storage temperature;
storage humidity.

The secondary rolls B2 (or primary rolls B1 coming directly from the winding step), are further processed in a conversion station 70, which allows a finished or semi-finished product to be obtained, and which can be present within the same production facility 11 in which the primary and/or secondary rolls were produced, or can be located in another production facility 50 (as in the current example).

The rolls in the conversion station have the unique identification code K (or Ki), with which there are associated, in the database system, all the product and/or process parameters associated with the previous processing operations (winding, optional rewinding, optional packaging).

The conversion station 70 is provided with a fifth electronic reading and/or writing device on electronic media, such as an RFID antenna 71 operatively connected with the electronic control device 30, adapted to read, for example, the second RFID labels 35 of the second rolls B2$i$ that reach this station, reading their secondary identification codes Ki. From this reading, the electronic control device 30 interacts with the second database DB2.

The conversion station 70 comprises one or more unwinding stations 72 (depending on the type of product to be produced, and therefore one or more rolls are connected to the production of the finished or semi-finished product), and a conversion machine 73. Naturally, the conversion station also comprises a management system 74 of the conversion station, with which there is associated an evaluation system 75 of the product unwound from the rolls and that enters the conversion machine that are packaged, which can comprise, for example, a visual inspection module. Sensors are provided inside the conversion machine to determine characteristics of the product being processed.

The process and/or product parameters acquired in this step are associated with the roll (or rolls) that is/are unwound, or with its/their identification code in the database system.

The parameters collected in the conversion step can come from the control system of the machine, from the sensors installed therein, from the visual inspection module and also directly from the operator.

The management system 74 of the conversion station also has the aim of sending the information collected to the database system.

The product and/or process parameters acquired and transmitted to the database system and therefore associated with the identification code of the roll (or rolls) processed in the conversion station can comprise one or more of the following:
conversion identifier (this identifies the processing operation being referred to);
conversion machine type (code that represents the machine);
width profile as a function of Y;
number of plies;
core diameter;
roll weight;
production start date and time;
production end date and time;
roll density;
operator or production manager identifier (the association between identifier and physical person is not known to the system);
unwinding speed profile as a function of Y (one for each roll being unwound);
processing speed profile as a function of Y;
acceleration as a function of Y;
elongation as a function of Y;
product shrinkage as a function of Y;
tension (or pull) profile applied as a function of Y (one for each roll being unwound);
included defects detected by detection system (for example viewing system), comprising:
no. included defects;
defect image (image of the defect);
defect type (code identifying the defect type and its dimensions);
position X (position of the defect with the roll reference system);
position Y (position of the defect with the roll reference system);
dimension along X;
dimension along Y;
defect area;
degree of severity;
machine stop as a function of Y (history of the machine stops associated with the Y axis)
tears occurring as a function of Y (history of the tears detected for example via optical system associated with the Y axis).

In the examples described above, specific reference was made to RFID electronic labels and corresponding RFID antennas for writing/reading these labels. In other embodiments, instead of electronic labels, graphic media can be used, for example paper labels on which alphanumeric, bar or QR codes or the like are represented. In this case, instead of antennas that remotely write and read the media, printers to print the graphic labels and optical reading devices of the graphic symbols represented are required. Alternatively, labels with magnetic bands and related writing and reading devices of the data stored in the magnetic band can be used.

In general, the media with which to associate the identification codes can be fixed to the cores on which the product is wound to create the roll, or to the outer surface of the roll itself.

Advantageously, the database system 31, or at least a section of this system, is associated with a server accessible via a telematic network also remotely, so that by reading the identification code G or K associated with an RFID label during processing in a second facility, it is possible to obtain the information associated with this code, i.e., with the primary roll B1 or B2 being processed, and hence the information on the position of the product and/or process parameters on this roll. Hence, the production process can take place in more than one facility. Therefore, for example, production and winding into primary rolls can take place in a first facility, rewinding can take place in a second facility and conversion can take place in a third facility (or these operations can take place in a different combination), and the history of the product and/or process parameters can still be associated with the rolls.

Therefore, it is clear that the system described above is capable of tracing and storing process and product parameters, among which product defects, along the production chain of a roll of thin product, to the final product (or semi-finished product) produced with said roll. The product and process parameters selected are stored in a database system associated with an identification code of the roll from which the final product (or semi-finished product) is produced.

According to the invention, all or some of these product and/or process parameters are used to predict the presence of product defects during an intermediate processing step of a thin product wound in roll, through a method which provides for:
receiving a roll of thin product that has been assigned a unique identification code stored in a database system and containing process and/or product parameters detected in the production steps of said thin product wound in said roll upstream of said intermediate processing step, associated with the unique identification code,
accessing the database system,
entering one or more of the process and/or product parameters associated with the unique identification code of the roll contained in the database system in a predictive model, which uses a correlation, created by means of machine learning logics, from historicized values related to the process and/or product parameters output from the intermediate processing step and historicized values related to process and/or product parameters of the same rolls detected in the production steps of said rolls upstream of said intermediate processing step, in order to predict product parameters output from said intermediate processing step,
comparing the aforesaid product parameters with respective predefined limit values,
generating predictive diagnosis information of thin product defects based on the result of said comparison.

Therefore, as a result of this method, it is possible to perform an action, in the intermediate processing step, adapted to modify the processing process parameters in order to avoid exceeding said limit values, or to reject portions of product potentially dangerous for any processing downstream of said station, with evident advantages for production.

For each intermediate step of which some parameters require to be predicted, the predictive model of said method therefore interacts with a first set of historical data related to a plurality of process and/or product parameters detected in the production steps of the rolls upstream of the intermediate processing step and a second set of historical data related to a plurality of process and/or product parameters detected output from the intermediate processing step of the prediction.

It is evident that in order to produce this method a certain amount of product and/or process parameters must be accumulated to be able to implement the predictive model.

In each processing step (production thin product, winding in primary roll, optional rewinding, optional packaging), all the parameters necessary to describe the process and the results in terms of quality and defects are collected.

For each step there are three groups of parameters:
the parameters that describe the production process, i.e., the operating conditions, which can be constant (e.g., cut, diameter, weight recipe), or variable along the wound product (e.g., speed, winding/unwinding tension, width of the strip of product, temperature of the product),
the parameters related to the material being processed: raw materials, bonding specifications, code of the rolls and so forth, and these are prevalently constant data,
the parameters that describe the quality and the defects of the product: the number and type depends on the processing operation, are characterized by topological information, such as coordinates referred to the length and width of the product; therefore, they can be meant as dynamically generated parameters, as they are dependent on each processing operation.

All the parameters are collected in the database system that centralizes the information and that is in turn connected to the electronic control device 30, which enables the processing thereof.

The aim of the processing system is to "correlate" characteristics of the input materials of the various production steps, with the operating conditions and with the defects, but also to optimize the settings to be applied to the machines involved in each step. To do this it is also possible to use the information (i.e., the product and/or process parameters) from the previous steps.

The operation is made possible both by the traceability of the processed materials, from the primary roll on, and by assigning process, quality and defect parameters, which are historicized as a function of the length on the Y axis, to each point of the roll.

The processing system is designed to create one or more machine learning models that describe the behavior of the systems in each step, predicting the defects, in order to:
operate on the process variables to avoid the formation of defects;
reject the defective portions or indicate the rolls that contain potentially defective positions for the process downstream.

The object is to obtain a guarantee of greater quality, both for semi-finished products and for the finished product, limiting or avoiding the occurrence of defects.

The mathematical-statistical models developed fall into the Artificial Intelligence (AI) or Machine Learning (ML) branch, as basically a procedure is developed through which the machine learns how to act/react autonomously following specific inputs. The artificial intelligence with which the system is provided thus consists of a series of specifically developed algorithms, to model scenarios such as the one described above.

The model is based on artificial intelligence algorithms that perform two functions:
the learning function;
the prediction function.

The learning function is based on the process and/or product parameters acquired. The aim of the learning step is to search for the structure of correlations and cause-effect relations existing between the variables of the system.

The learning function implements a correlation between all the parameters historicized in the previous steps and the parameters (mainly the defects) identified in the subsequent steps, such as the conversion and rewinding step and the quality of the product.

This operation allows the development of an artificial intelligence model that correlates the product/process parameters (advantageously, the defects) and the quality of the product with the conditions that are capable of influencing the appearance of the defect. The learning function generates a mathematical model of the processing steps: the prediction function.

The prediction function has the aim of indicating the potential product and/or process parameters (advantageously, the defects) that can appear in real, or almost real, time based on the parameters detected up to that moment.

The use of Artificial Intelligence techniques is motivated by the fact that the type and the quantity of data falls within the definition of Big Data:

Volume: quantity of data (structured, unstructured) generated in the unit of time; the database collects a large quantity of data generated by heterogeneous sources;

Variety: the data are of different types and are historicized both in unstructured and in semi-structured formats;

Speed: the speed with which the new data are generated, hence the production frequency of the datum, i.e. the sampling frequency; in addition to datum generation speed, the speed at which the data must be processed is also considered.

The learning step consists of two macro steps, an explorative step and a development step of the models. Once the explorative step, necessary to gain confidence with the system in question and consolidate the database to be used to build the models, has terminated, this is followed by the Machine Learning part, which respects the following workflow:

identification of the data sources to be used for analysis;
data cleaning;
extraction of the characteristics to be analyzed;
development of the Machine Learning models;
definition of a test group of characteristics to be analyzed;
start of the learning step;
choice of the models and of the algorithms with the highest performance;
in-depth evaluation of the Machine Learning algorithms selected;
selection of the best Machine Learning model;
issue of the Machine Learning model;
control of the performance of the Machine Learning model, in order to make adjustments, integrations or improvements.

In the workflow to be followed to generate a complete Artificial Intelligence infrastructure, two iterative cycles are provided: a first cycle that goes from the creation step of descriptive functions to the structuring step of the test group, a second cycle that goes from the start step of the learning step to the model selection step. This second step is the actual learning step.

Currently many algorithms are available for data analysis and developing Artificial Intelligence infrastructures. In brief, algorithms based on linear models, such as principal component analysis (PCA) or partial least squares (PLS) regression, or nonlinear algorithms, such as artificial neuron networks (ANN) or, even newer, algorithms that are part of the Deep Learning ecosystem, are available. The type of algorithm to use, or from which to choose, depends on the type of data and on the purpose of the work, i.e. if it is an unsupervised (explorative) or supervised (aimed at classifying or finding cause-effect relations) analysis.

Preferably, analysis of parameters whose structure is fixed, such as the characteristics of the raw materials or the operating parameters of the machine, can be carried out with algorithms such as PCA (in the case of explorative analysis) or PLS and Random Forest. Instead, when analyzing parameters coming from acquisitions of variable duration, such as rewinding or converting processes, or from large quantities of complex parameters, such as defect images, it is instead advantageous to use Deep Learning algorithms, such as, respectively, the Long Short-Term Memory (LSTM) algorithm for the time series and the Convolutional Neural Network (ConvNet) for the images.

The software used for this analysis is of self-adaptive type, i.e. is capable, as the database expands and product defects and qualities are recorded, of updating the models in use. In fact, the software comprises a preset learning model, which allows product and/or process parameters (advantageously, defects and qualities) associated with the finished product, to be predicted, but this software also comprises an automatic learning functionality whose function is to update, as the database expands, the criteria of the preset models and improve them. The present models are controlled at specific deadlines, updating them with the new process and/or product parameters. If the performances of the model improve, the new criteria are kept, otherwise the criteria of the model previously in use remain in force.

Example 1

Assume to have a process in which products wrapped in tissue paper are created and composed of the primary step (in-line production and winding on a primary roll), packaging and conversion. The rewinding step in the example in question is not present and the conversion operates directly with single-ply rolls of primary type (Master Rolls).

During the production step it is necessary to guarantee a product that limits processing problems in the conversion step.

The process allows some of the parameters indicated above to be collected, and in particular in the primary step at least the following measurements:

roll identifier (this is the identification code of the primary roll);
product type identification (code that identifies the product type; the grading depends on the type of product/process/producer/customer);
machine type (code that represents the winding machine);
roll length;
format width;
external diameter;
basis weight;
basis weight tolerance;
core type;
core diameter;
roll weight;
production start date and time;
production end date and time;
roll density;
production line speed profile as a function of Y;
winder speed profile as a function of Y;
basis weight profile in Cross Direction (or X axis) and along Y (the profile along the X axis is measured by the QCS systems; the system historicizes the basis weight vectors measured along X to create the complete profile along X and Y. The resolution and hence the number of points stored depends on the resolution of the QCS tool. By way of example the resolution along X can be 32 sectors along the width of the product)
Included defects detected by the detection system (for example, viewing system), comprising:
no. included defects;
defect type (code that identifies the defect type and its dimensions);
position X (position of the defect with the roll reference system);
position Y (position of the defect with the roll reference system);
dimension along X;
dimension along Y;

defect area;
degree of severity;
roll growth profile diameter/meters wound (this represents the diameter of the roll as a function of Y).

During the packaging and transport step at least the identification code of the roll is acquired to trace its transit from that step.

During the subsequent conversion step of the roll, at least the following parameters are acquired:
conversion identifier (this identifies the conversion process in progress);
roll identification (the identification code of the roll being converted, in the relative unwinding station, is identified; there can be one or more rolls);
type of conversion machine (code that represents the machine);
number of plies of the thin product in conversion from the roll;
production start date and time;
production end date and time;
unwinding speed profile as a function of Y (one for each roll);
processing speed profile as a function of Y;
machine stop as a function of Y (history of the machine stops associated with the Y axis);
tears occurring as a function of Y (history of the tears detected for example by means of optical system associated with the Y axis).

The process in question stores the aforesaid parameters for the processed rolls. The storage process takes place on a relational/non-relational hybrid structure so as to store and make all the available parameters effectively usable. In fact, in the process in question there are parameters of static type, such as the roll identifier, the product type or machine type identifier, which are not destined to change during the process, while other data, such as the winder speed profile or the unwinding speed profile must be recorded time by time with a sufficiently high frequency. The former can be stored an SQL database, while the latter must be stored in databases more suitable to rapidly manage large quantities of data (such as time-series databases, among which those known with the trade names "Cassandra", "Historian", etc.).

After the system has collected a substantial history of process and product parameters, the learning function is capable of developing a mathematical model that correlates the tears that occurred in the conversion step with all the other parameters. In the model development step a first explorative analysis step is performed, which makes it possible to understand the effective level of consolidation of the parameters and any need to produce specific functions that synthesize the parameters appropriately. In this step preprocessing and cleaning procedures are also performed until the data related to the parameters is ready to be used for the construction of models. This path is mainly implemented using principal component analysis (PCA) or graphic visualization techniques. These techniques are of unsupervised type, i.e. without a priori hypothesis, to avoid "polluting" the results of the analysis. The procedure described above must then be included in a defined, standardized and reproducible analysis protocol (algorithm), as this must be the funnel through which all the parameters, produced during future processing operations, must pass in order to be readily usable in the following predictive models.

To construct a predictive model one or more target variables are defined, in this case, the target variables can, for example, be:
basis weight;
defects;
machine stops;
tears.

By way of example, the tear is considered. Therefore, basis weight and defects become predictor parameters, together with the other variables. The aim is to prevent the formation of tears and hence to understand what the predictors are and what properties they must have (value) for the tear to occur. The model chosen is a classification algorithm that will tell us the conditions in which the tear occurs. The input data are all those indicated in the lists above, with the exception of the static data (e.g., machine type, unless the algorithm is also be extended to other machines) or in any case set by the operator, which will only be used as initial reference, to differentiate this production from the others.

The principal classification algorithms to be tested are: PLS-DA, Random Forest, SVM and ANN. Performance indicators are used to verify which one allows the best performances to be obtained and the algorithm with the best performance is selected. The analysis procedure takes place by defining a parameter test group and a validation group comprising around 20% of the original data, which is equally representative. The test group is used to train and calibrate the algorithm, while the validation group is used to perform an external validation.

The classification algorithm has two outputs:
the predictive model, which will indicate, before the tear occurs, that this might occur;
a selection of variables, with corresponding threshold values, which are effectively those that determine whether or not a tear can form; this selection allows reduced models that are lighter and faster to use to be obtained.

The model is then re-trained in the reduced form and put in production.

In concrete terms, for example, the model can tell us that the paper may tear when the winding speed exceeds 400 m/min and the basis weight in the point of the tear differs by more than −10% from the nominal basis weight, although it is within the permitted tolerance. This allows the development of a protocol/algorithm model that indicates and predicts to the operator or to the machine during formation that in at the moment in which these parameters assume given values, a defect can be generated. At that point the machine or the operator can correct the process to avoid the critical condition of the parameters of the roll and for the rolls already produced the system can configure the conversion machine in order to limit the damaging effect of that combination of parameters (e.g. automatic speed reduction in that section of product). In practice, the predictive model has considered at least two different process and/or product parameters correlated to each other (unwinding speed and basis weight) and detected upstream of the intermediate processing step, in order to predict an event, i.e. a process and/or product parameter such as preferably a product defect or an inauspicious process event (the tear, in this case).

Example 2

Let us consider a process for nonwoven products in the conversion step of which several plies of nonwoven of the same nominal width are joined and bonded.

The process consists of the primary step (nonwoven production, winding in primary roll), rewinding, packaging and conversion step.

During the unwinding and processing step in the final conversion machine the nonwoven product can be subject to variations in width with respect to the original width of the product due to the different unwinding tension. It is observed that in some cases the extent of narrowing varies between the plies to be joined resulting in a final product that does not conform or is in any case of lower quality. The interactions and influences of the production and winding factors of the product that cause different narrowing between the plies must be identified.

With regard to the product and process parameters to be considered, these are at least all those indicated previously for the primary step, rewinding, packaging and the conversion step.

The process in question stores the aforesaid parameters for the processed rolls. The storage process takes place on a relational/non-relational hybrid structure so as to store and make all the available parameters effectively usable. In fact, in the process in question there are parameters of static type, such as the roll identifier, the product type or machine type identifier, which are not destined to change over the course of the process, while other parameters, such as the winder speed profile or the unwinding speed profile must be recorded time by time with a sufficiently high frequency. The former can be stored in an SQL database, while the latter must be stored in databases more suitable to rapidly manage large quantities of data (such as time-series databases, among which those known with the trade names "Cassandra", "Historian", etc.).

After the system has collected a substantial history of process and product parameters, the learning function is capable of developing a mathematical model that correlates the difference between the nominal width of the plies and the width profile of the plies as a function of Y in the point closest to the joining step (narrowing) on the conversion machine, considering all the other parameters of all the other steps involved.

In the model development step a first explorative analysis step is performed, which makes it possible to understand the effective level of consolidation of the parameters and any need to produce specific functions that synthesize the parameters appropriately. In this step preprocessing and cleaning procedures are also performed until the data related to the parameters is ready to be used for the construction of models. This path is mainly implemented using principal component analysis (PCA) or graphic visualization techniques of "unsupervised" type, i.e. without any a priori hypothesis. The procedure described above must then be included in a defined, standardized and reproducible analysis protocol (algorithm), as this must be the funnel through which all the data, produced during future processing operations, must pass in order to be readily usable in the following predictive models.

To construct a predictive model one or more target variables are defined, in this case, the target variable is the difference between the nominal width of the plies and the real width as a function of the joining points. Unlike what disclosed in the previous example, this variable is a continuous variable, and therefore must be analyzed using different algorithms to the previous ones.

The model that is chosen will tell us which are the operating parameters that have the most effect on the joining step of the plies and the conditions in which it is best to operate. The input data to be used are all those indicated in the examples above, with the exception of the static data (e.g., machine type, unless the algorithm is also be extended to other machines) or in any case set by the operator, which will be used only as initial reference, to differentiate this production from the others.

The principal regression algorithms to be tested are: PLS, Lasso Regression, Ridge regression, SVM and ANN. Performance indicators are used to verify which one allows the best performances to be obtained and the algorithm with the best performance is selected. The analysis procedure takes place by defining a parameter data test group and a validation group comprising around 20% of the original parameter data, which is equally representative, as is the test group, of the parameter group being analyzed. The test group is used to train and calibrate the algorithm, while the validation group is used to perform an external validation.

The classification algorithm has two outputs:
  The predictive model, indicates the variables with the greatest influence on joining of the plies. This selection allows reduced models that are lighter and faster to use to be obtained. Therefore, a reduced model that only contains the most significant variables will be created.
  Optimal operating conditions, given the type of processing.

The model is then re-trained in reduced form and put in production.

In concrete terms, for example, it can be observed that the narrowing profile has a plurality of correlations with different degrees with numerous parameters detected in the steps upstream. The strongest correlation is obtained with the basis weight profile and the width profile of the ply detected in the previous steps, with the pull and slip in the conversion step.

By means of the learning function it can be observed that in the cases in which there is the greatest difference between the narrowings of the plies of the same processing operation, the system identifies that the greatest differences between the rolls loaded into the conversion machine reside in the speed of the line in the primary step.

This conclusion possible by means of the subject-matter of the invention allows action to be taken to improve the formation and winding process, dynamically correcting the operating tension on the conversion machine, to optimally mate the plies (e.g. with formation speeds close to one another) or to mark the product in advance with a degree of nonconformity.

It is understood that the drawing only shows possible non-limiting embodiments of the invention, which can vary in forms and arrangements without however departing from the scope of the concept on which the invention is based. Any reference numerals in the appended claims are provided purely to facilitate the reading thereof, in the light of the above description and accompanying drawings, and do not in any way limit the scope of protection.

The invention claimed is:

1. A method for predicting presence of product defects during an intermediate processing step of a thin product wound in a roll, which provides for
  receiving a roll of the thin product wound in the roll that has been assigned a unique identification code stored in a database system, the database system comprising at least one of process parameters and product parameters detected in production steps of said thin product wound in said roll upstream of said intermediate processing step, associated with said unique identification code,
  accessing said database system,
  entering the at least one of the process parameters and product parameters associated with the unique identification code of said roll of the thin product wound in the roll contained in said database system in a model, wherein the model is a predictive model, which uses a correlation, created by means of machine learning logics, from historicized values related to the at least one of the process parameters and the product parameters output from said intermediate processing step and historicized values related to the at least one of the process parameters and product parameters of the roll of the thin product wound in the roll detected in the production steps of said thin product wound in the roll upstream of said intermediate processing step, in order to predict the at least one of the process parameters and the product parameters output from said intermediate processing step, comparing at least one of predicted process parameters and product parameters with respective predefined limit values, generating a predictive diagnosis information of at least one thin product defect based on said comparison, wherein, subsequent to said generation of predictive diagnosis information, the method comprises an action, in said intermediate processing step, adapted to modify the at least one of the process parameters and product parameters in order to avoid exceeding said respective predefined limit values, or to reject portions of product potentially defective for any processing downstream of a station.

2. Method according to claim 1, wherein said predictive model considers the at least one of the process parameters and the product parameters and at least another one of the process parameters and the product parameters correlated with one another by means of machine learning logics and detected upstream of the intermediate processing step, in order to predict an event, or the at least one of the process parameters and the product parameters, the at least one of the process parameters and the product parameters being different from the at least another one of the process parameters and the product parameters.

3. Method according to claim 1, wherein said predictive model uses a first set of historical data related to the at least one of the process parameters and the product parameters and another one of the at least one of the process parameters and the product parameters detected in the production steps of the thin product wound in the roll upstream of the intermediate processing step and a second set of historical data related to the at least one of the process parameters and the product parameters and another one of the process parameters and the product parameters detected output from the intermediate processing step of the prediction; by means of artificial intelligence or machine learning algorithms, a learning function is generated that correlates said first set of historical data and said second set of historical data, generating a prediction function that allows the prediction, by analyzing one or more of the at least one of the process parameters and the product parameters and another one of the at least one of the process parameters and the product parameters detected upstream of the intermediate processing step, of the at least one of the process parameters and the product parameters and another one of the at least one of the process parameters and the product parameters output from said intermediate processing step.

4. Method according to claim 1, wherein said intermediate processing step is a rewinding step, comprising unwinding of the thin product of a roll, defined primary roll, and winding of the thin product in one or more rolls, defined secondary rolls, with lateral dimensions the same as or smaller than the primary roll, wherein there is associated with said primary roll a said unique identification code, defined primary code, stored in said database system and with which there are associated the at least one of the process parameters and the product parameters detected in the production steps of said thin product wound in the roll upstream of said rewinding step, and there is associated with each secondary roll a related said unique identification code, defined secondary code, with which there are associated the at least one of the process parameters and the product parameters and another one of the at least one of the process parameters and the product parameters detected in the production steps of said thin product wound in the roll upstream of said rewinding step, and the at least one of the process parameters and the product parameters detected in the rewinding step, or a conversion step of the thin product wound in the roll into a finished or semi-finished article, which includes unwinding of the roll of the thin product and insertion of the thin product wound in the roll into a conversion module of the thin product wound in the roll into the finished or semi-finished article.

5. Method according to claim 1, wherein, in said database system, there are associated with said unique identification code of said at least one of the process parameters and the product parameters detected during inline production of said thin product wound in the roll and/or during subsequent winding of said thin product wound in the roll produced in line into said roll.

6. Method according to claim 1, wherein in said database system, there are associated with said unique identification code of said at least one of the process parameters and the product parameters detected during a packaging step of said roll.

7. Method according to claim 1, wherein said at least one of the process parameters and the product parameters, for a related roll, are stored as a function of the position of the area of the product in the at least one of the process parameters and the product parameters of which at least one of the process parameters and the product parameters was detected.

8. Method according to claim 7, wherein the position of the area of the product in the at least one of the process parameters and the product parameters of which the at least one of the process parameters and the product parameters was detected is stored by means of a system of coordinates with origin referred to the thin product wound in the roll, comprising a first axis of coordinates parallel to the axis of the roll, with zero corresponding to a side of the roll, and a second axis of coordinates corresponding to the linear unwinding of the thin product wound in the roll about the axis of the roll on which it is wound, with origin coinciding with the starting point of winding of the thin product wound on the roll on the core of the roll.

9. Method according to claim 1, wherein assigning a unique identification code to said roll of the thin product wound in the roll includes marking said roll by applying an a) graphic, b) electronic, comprising RFID type, or c) magnetic band medium, containing said unique identification code, and storing said unique identification code in said database system.

10. Method according to claim 9, wherein, in the case of the magnetic band medium, the method includes a programming step for assigning said primary identification code of said magnetic band medium, which takes place before applying the magnetic band medium to said roll, or when said magnetic band medium is applied to the roll.

11. Method according to claim 1, comprising a step of reading the unique identification code of said roll at the start of said intermediate processing step of the thin product wound in said roll.

12. Method according to claim 1, wherein the at least one of the process parameters and the product parameters that can be associated with the roll and to be detected upstream of the intermediate processing step or during the intermediate processing step, and the historicized values used in the predictive model are chosen from two or more of the following: product type identification; machine type, roll length, roll format width, external roll diameter, width profile as a function of wound length, as a function of Y, basis weight of the thin product wound in the roll, basis weight tolerance of the thin product wound in the roll, type of core on which the thin product wound on the roll to produce the roll, core diameter, spindle identifier, roll weight, roll production start date and time, roll production end date and time, room temperature, relative humidity, product quality grade, roll quality grade, roll density, roll density profile as a function of Y, operator or production manager identifier, production line speed profile as a function of Y, winder speed profile as a function of Y, production line acceleration as a function of Y and/or winder acceleration as a function of Y, surface treatments applied, position of surface treatments, basis weight profile along X and along Y, thickness profile along X axis and along Y, humidity profile along the X axis and along Y, formation specifications, type of bonding, mix of fibers used, or mix of polymers used, degree of refinement, mix of types of water used, coagulant concentration, flocculant concentration, slurry conductivity, mechanical properties such as load, wet burst, elastic constant, temperatures detected along formation of the product along Y, oven or hood temperature profile along Y, print pitch along Y, nip force applied per unit of length by calender along Y, calender temperature along Y, winding tension profile along Y, winder slip profile, type of control applied, production recipe identifier, included defects detected by a detection system, roll growth profile diameter/meters wound, video images collected along a formation of the product with time stamping referred to Y axis of the roll.

13. Plant for producing rolls of thin products, adapted to implement the method according to claim 1.

14. Plant for producing rolls of thin products, comprising
- a production line of continuous thin product, comprising a control system capable of knowing at least one of product parameters and process parameters of a same line,
- a database system containing the at least one of the product parameters and the process parameters detected during production of the continuous thin product and of rolls and identification codes of the rolls produced associated with the at least one of the product parameters and the process parameters related to said rolls,
- at least a winder positioned at an outlet of said production line of the continuous thin product, adapted to wind the continuous thin product exiting from said line in a primary roll, comprising a management system of the winder, at least one of a reading and writing device on graphic, electronic or magnetic media, to be associated with the primary roll being wound, adapted to write or program said graphic, electronic or magnetic media, operatively connected with said management system of the winder and an evaluation system of the continuous thin product entering the winder, comprising at least one of a quality control module QCS, a visual inspection module of defects; and of a type that detects metal particles,
- a rewinder adapted to produce one or more secondary rolls from said primary roll coming from the winder, comprising the evaluation system of the continuous thin product being wound in the secondary rolls, which comprises at least one of the visual inspection module of the defects, of the type that detects metal particles, and the quality control module QCS, a reading device of the identification codes of the roll being unwound, and at least one of the reading and writing device on graphic, electronic or magnetic media, of identification codes to be associated with the one or more secondary rolls being wound, and the management system adapted to communicate the at least one of the product parameters and the process parameters detected by said evaluation system of the product being wound to said database system in association with the identification codes of the one or more secondary rolls to which said at least one of the product and the process parameters refer,
- a packaging station for primary or secondary rolls, comprising the reading device of the identification codes of the rolls on magnetic media associated with said rolls, and the management system of a packaging step, with which there is associated the evaluation system of the rolls that are packaged, which comprise the visual inspection module, said management system being adapted to communicate the at least one of the product parameters and the process parameters associated with the packaging step and detected by said evaluation system of the rolls being packaged to said database system in association with the identification codes of the rolls to which said at least one of the product parameters and the process parameters refer,
- a conversion station for rolls into finished or semi-finished products, comprising one or more unwinding stations for one or more rolls, a conversion machine of said one or more rolls, the reading device of the identification codes of the rolls being unwound, the evaluation system of the product unwound from the rolls and entering the conversion machine, which comprise the visual inspection module, sensors of the conversion machine are present to determine parameters of a product being processed, the at least one of the process parameters and the product parameters acquired during the conversion step being associated with respective rolls being unwound, or with their identification codes in the database system,
- a management software of the at least one of the process parameters and product parameters associated with the identification codes of the rolls contained in said database system, in which there is implemented a predictive model, which uses a correlation, produced by machine learning logics, between historicized values related to the at least one of the process parameters and the product parameters output from a processing step of the plant and historicized values related to the at least one of the process and the product parameters of the rolls detected in production steps of said rolls upstream of said intermediate processing step, said predicative model being adapted to predict from one or more of the processing step and a set of features from the production line to output the product parameters,
- or a set of features from the production line, the database system, the conversion system, the management software with mixtures of features of the winder, the rewinder, the packaging station, the quality control module QCS.

15. Plant according to claim 14, comprising means for varying the at least one of the process parameters and the product parameters of at least one of said production line of thin product, said winder, said packaging, said rewinder, and said conversion station, adapted to modify the at least one of the process parameters and the product parameters in order to avoid exceeding said limit values, or to reject portions of continuous thin product potentially defective for any processing downstream of a station.

16. Plant according to claim 13, further comprising:
the production line of the continuous thin product, comprising the control system capable of knowing the at least one of the product parameters and the process parameters of the same line;
the database system containing the at least one of the product parameters and the process parameters detected during production of the continuous thin product and of the rolls and identification codes of the rolls produced associated with the at least one of the product parameters and the process parameters related to said rolls;
at least winder positioned at the outlet of said production line of continuous thin product, adapted to wind the continuous thin product exiting from said line in the primary roll, comprising the management system of the winder, at least one of the reading device and writing device on graphic, electronic or magnetic media, to be associated with the primary rolls being wound, adapted to write or program said media, operatively connected with said electronic management unit and the evaluation system of the product entering the winder, comprising one of the quality control module QCS, the visual inspection module of the defects and of the type that detects metal particles;
the rewinder adapted to produce one or more secondary rolls from said primary rolls coming from the winder, comprising the evaluation system of the product being wound in the secondary rolls, which comprise at least one of the visual inspection module of the defects and the type that detects metal particles, and a further quality control module QCS, a further reading device of the identification code of the roll being unwound, and at least one of a further reading device and a further writing device on graphic, electronic or magnetic media, of identification codes to be associated with the secondary rolls being wound, and the management system adapted to communicate the at least one of the product parameters and the process parameters detected by said evaluation system of the continuous thin product being wound to said database system in association with the identification codes of the secondary rolls to which said at least one of the product parameters and the process parameters refer;
the packaging station for primary or secondary rolls, comprising the reading device of the identification codes of the rolls on media associated with said rolls, and the management system of the packaging step, with which there is associated an evaluation system of the rolls that are packaged, which comprise the visual inspection module, said management system being adapted to communicate the at least one of the product parameters and the process parameters associated with the packaging and detected by said evaluation system of the rolls being packaged to said database system in association with the identification codes of the rolls to which said at least one of the product parameters and the process parameters refer;
the conversion station for rolls into finished or semi-finished products, comprising one or more unwinding stations for one or more rolls, the conversion machine of said one or more rolls, the reading device of the identification codes of the rolls being unwound, the evaluation system of the product unwound from the rolls and entering the conversion machine, which comprise the visual inspection module, sensors of the conversion machine are present to determine the at least one of the product parameters and the process parameters of the product being processed, the at least one of the product parameters and the process parameters acquired during the conversion step being associated with the respective rolls being unwound, or with their identification codes in the database system;
management software of the at least one of the product parameters and the process parameters associated with the unique identification codes of the rolls contained in said database system, in which there is implemented a predictive model, which uses the correlation, produced by machine learning logics, between historicized values related to the at least one of the product parameters and the process parameters output from the processing step of the plant and historicized values related to the at least one of the product parameters and the process parameters of the same rolls detected in the production steps of said rolls upstream of said intermediate processing step, said predictive model being adapted to provide predicted product parameters as output from said intermediate processing step;
a means for varying the at least one of the product parameters and the process parameters of at least one of said production line of said thin product, said winder, said packaging, said rewinder, and said conversion station based on the predicted product parameters, wherein the at least one of the product parameters and the process parameters is modified in order to avoid exceeding said limit values, or to reject portions of product potentially dangerous for any processing downstream of said station.

17. Plant according to claim 16, wherein said predictive model considers the at least one of the process parameters and the product parameters and another one of the process parameters and the product parameters correlated with one another by means of machine learning logics and detected upstream of the intermediate processing step, in order to predict an event, or the at least one of the process parameters and the product parameters, the at least one of the process parameters and the product parameters being difference from the another one of the process parameters and the product parameters.

18. Plant according to claim 16, wherein said predictive model uses a first set of historical data related to the at least one of the process parameters and the product parameters and another one of the process parameters and the product parameters detected in the production steps of the rolls upstream of the intermediate processing step and a second set of historical data related to the at least one of the process parameters and the product parameters and another one of the process parameters and the product parameters detected output from the intermediate processing step of the prediction; by means of artificial intelligence or machine learning algorithms, the learning function is generated that correlates said first set of historical data and said second set of historical data, generating the prediction function that allows the prediction, by analyzing one or more of the the at least one of the process parameters and the product parameters and another one of the process parameters and the product parameters detected upstream of the intermediate processing step, and the at least one of the process parameters and the product parameters and another one of the process parameters and the product parameters output from said intermediate processing step.

* * * * *